United States Patent [19]
Thomas

[11] 3,880,523
[45] Apr. 29, 1975

[54] MULTIPLE CHANNEL COLORIMETER

[75] Inventor: Alan John Thomas, Petersham, Richmon, England

[73] Assignee: The Rank Organisation Limited, London, England

[22] Filed: Aug. 17, 1973

[21] Appl. No.: 389,315

[30] Foreign Application Priority Data
Aug. 17, 1972 United Kingdom............... 38414/72

[52] U.S. Cl. .................... 356/79; 250/227; 356/96; 356/100
[51] Int. Cl............................ G01j 3/40; G01j 3/12
[58] Field of Search ........... 356/79, 96, 98, 99, 100; 350/96 B; 250/227

[56] References Cited
UNITED STATES PATENTS
3,535,537  10/1970  Powell ............................. 250/227
3,537,796  11/1970  Dudeney ............................. 356/79
3,549,264  12/1970  Christie............................. 250/227

OTHER PUBLICATIONS
A Ten Channel Infrared Spectrograph; Josa; Vol. 41 No. 2; Feb. 1951; Agnew et al.; pg. 76-79.

Primary Examiner—Vincent P. McGraw
Attorney, Agent, or Firm—Brisebois & Kruger

[57] ABSTRACT

A multichannel colorimeter wherein diffraction means is used to produce a band spectrum of light for passage through the test material. The spectrum-forming light is incident on a screen provided with one or more rows of apertures distributed to receive light in different wavebands of the spectrum. A light guide for transmitting light to a detector is adapted to fit releasably into the apertures on the side of the screen remote from the incident light. The invention makes multichannel testing possible with a simple light source and without the use of expensive filters.

7 Claims, 1 Drawing Figure

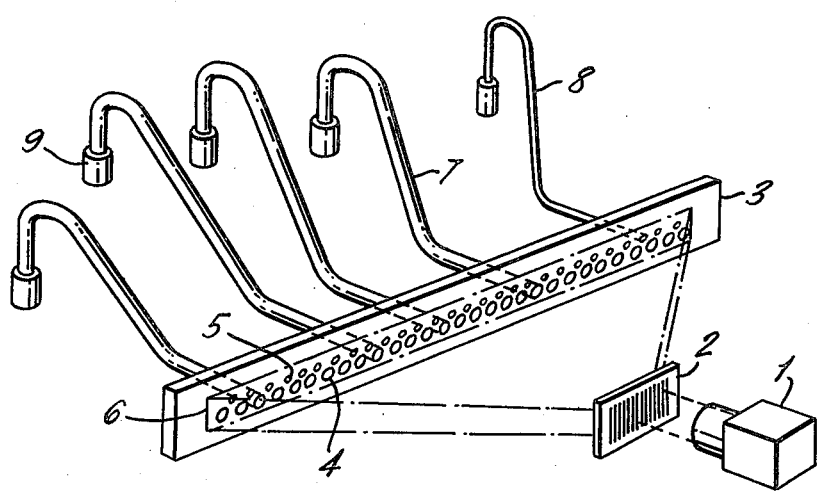

MULTIPLE CHANNEL COLORIMETER

This invention relates to a multiple channel colorimeter i.e. a colorimeter for measuring the different colour properties of a material which may be a liquid. The liquid may be in the form of a flowing stream.

In such a colorimeter a separate detector head is provided for each waveband of the spectrum over which separate measurements are to be taken. In the known construction of multiple channel colorimeter a separate light source is arranged to direct light to each detector head, the appropriate waveband being selected by the use of an appropriate interference filter. The known construction has the disadvantage of being bulky and expensive because light sources are bulky and produce a considerable quantity of heat which must be dissipated and interference filters are expensive, yet a separate filter must be provided for each waveband over which measurements are to be made.

The technical advance to be achieved is thus to provide a colorimeter which overcomes the existing disadvantages of large bulk and incorporation of a number of interference filters and it is an object of the present invention to provide a multiple channel colorimeter which overcomes these disadvantages.

A multiple channel colorimeter according to the invention incorporates a light source, a light diffracting means arranged to receive light emitted from the light source and produce a spectrum of the light, a spectrum screen located to receive the spectrum, said screen being formed with at least one row of apertures extending in the direction of the length of the spectrum, at least one light guide formed at one end with a plug arranged to fit into any one of the apertures from the rear face of the screen and hold the said end of the light guide exposed to the part of the spectrum falling on that part of the screen and a detector head capable of taking part in the desired colorimetric measurements fitted to the other end of the light guide to receive light transmitted therethrough.

The light diffracting means may be a diffraction grating or a prism.

The light guide may be a bundle of optical fibres.

The screen may be formed with several parallel rows of apertures.

Where the screen is formed with several rows of apertures the apertures in selected rows may be staggered from one another. Additionally or alternatively the apertures in selected rows may have different transverse dimensions, at least one light guide being provided for each row, the plug on the respective light guide being arranged to fit the apertures of the respective row.

A practical embodiment of the invention is illustrated in the accompanying diagrammatic drawing in which 1 denotes a light source, 2 denotes a diffraction grating constituting light diffracting means. 3 denotes a spectrum screen formed with two rows of apertures 4 and 5, the apertures of the row 5 being smaller than the apertures of the row 4 and being staggered with respect to the apertures of the row 4, the rows of apertures extending in the direction of the length of the spectrum 6 produced on the screen 3 by the diffraction grating 2. 7 denotes light guides one end of each of which is formed as a socket to enter a chosen aperture of the row of apertures 4 and 8 denotes a light guide one end of which is formed as a socket to engage a chosen aperture of the row of apertures 5. The other end of each of the light guides 7 and 8 terminates at a detector head 9.

In practice, light from the light source 1 is split up by the diffraction grating 2 and the spectrum of the light projected on to the screen 3 to form a visible spectrum 6. Any particular aperture 4 or 5 in the screen 3 thus receives light of a narrow waveband the width of which is defined by the transverse dimension of the particular aperture. To supply light of a particular waveband to any one of the detector heads 9 the socket end of the associated light guide is plugged into the appropriate aperture in the screen 3 and conveys light in that waveband to the detector head 9 for use in the particular colorimetric measurement. The apertures 5, being of smaller diameter than the apertures 4, cover narrower wavebands than are covered by the apertures 4 and thus provide light which is more nearly monochromatic light. In the illustrated construction each aperture being staggered from the adjacent apertures 4 covers a slightly different waveband from the adjacent apertures 4. It will be understood, of course, that the apertures 5 could have been arranged vertically above the apertures 4, or the apertures 5 being smaller in transverse dimension that the apertures 4 could be so arranged that some apertures are vertically above and some staggered with respect to the apertures 4, i.e. there would be a greater number of the smaller apertures 5 thus providing both a greater choice of waveband and a narrower waveband for each light source.

The single isolated light source is easily cooled, the single diffracting means reduces the expense over known multiple channel colorimeters and the plug-in light guides provide a versatility of operation not found in known multiple channel colorimeters.

It will also be apparent, in accordance with the principles of the invention, that a single light guide may be traversed along the spectrum and positioned so as to isolate any wavelength within the range of the instrument, and that the light paths are reversible so that the spectral characteristics of a source may be analysed by substituting a photo sensitive detector for the lamp.

I claim:

1. In a multiple channel colorimeter comprising a light source, light diffraction means for producing a spectrum from the light emitted by the source, and light-receiving means including a detector device for receiving the spectrum-forming light after passage thereof through the test material, the improvement that the said light-receiving means comprises:
    an apertured screen for receiving the spectrum-forming light on its front face, said screen having a plurality of apertures distributed to receive light in different parts of the spectrum, and
    at least one light guide in the form of a fibre optic bundle which is formed at one end as a plug adapted to fit releasably into at least some of the apertures at the rear face of the screen and which carries the detector device at its other end.

2. A colorimeter according to claim 1, wherein the apertures in the screen are positioned in at least one row extending in the direction of a band spectrum formed by the diffraction means.

3. A colorimeter according to claim 2, wherein the diffraction means is constituted by a diffraction grating.

4. A colorimeter according to claim 2, wherein the apertures are arranged in at least two rows.

5. A colorimeter according to claim 1, wherein the apertures are arranged in a plurality of parallel rows including a row which has apertures staggered in the direction of the rows with respect to the apertures in another row.

6. A colorimeter according to claim 5 wherein the staggered apertures of one row have a different dimension in the direction of the rows to the corresponding dimension of the apertures of another row, at least one light guide being provided for each aperture dimension.

7. A colorimeter according to claim 1, including apertures in the screen of at least two differing dimensions, and a light guide for each aperture dimension.

* * * * *